(12) United States Patent
Sandacz et al.

(10) Patent No.: US 8,936,761 B1
(45) Date of Patent: Jan. 20, 2015

(54) APPARATUSES AND RISERS FOR REACTING FEEDSTOCK IN THE PRESENCE OF CATALYST AND METHODS FOR FABRICATING RISERS

(71) Applicant: UOP LLC, Des Plaines, IL (US)

(72) Inventors: Michael S. Sandacz, Glen Ellyn, IL (US); Robert L. Mehlberg, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 35 days.

(21) Appl. No.: 13/972,796

(22) Filed: Aug. 21, 2013

(51) Int. Cl.
| | | |
|---|---|---|
| B01J 8/18 | (2006.01) | |
| B01J 8/00 | (2006.01) | |
| B01J 8/08 | (2006.01) | |
| B01J 19/00 | (2006.01) | |
| B01J 19/24 | (2006.01) | |
| F27B 15/00 | (2006.01) | |
| F27B 15/02 | (2006.01) | |
| C10G 11/18 | (2006.01) | |
| B01J 8/26 | (2006.01) | |

(52) U.S. Cl.
CPC . *B01J 19/006* (2013.01); *B01J 8/26* (2013.01)
USPC ........... 422/214; 422/139; 422/140; 422/145; 422/215; 422/224; 208/113

(58) Field of Classification Search
CPC .................. B01J 8/00; B01J 8/08; B01J 8/18; B01J 19/00; B01J 19/24; F27B 15/00; F27B 15/02; C10G 11/18
USPC .................. 422/214, 139, 140, 145, 215, 224
See application file for complete search history.

(56) References Cited

U.S. PATENT DOCUMENTS

| | | | |
|---|---|---|---|
| 4,417,974 A | 11/1983 | Haunschild | |
| 4,721,603 A | 1/1988 | Krug et al. | |
| 4,963,328 A | 10/1990 | Haddad et al. | |
| 5,139,748 A * | 8/1992 | Lomas et al. | .................. 422/140 |
| 5,306,418 A | 4/1994 | Dou et al. | |
| 5,338,438 A * | 8/1994 | Demoulin et al. | ............ 208/153 |
| 5,455,010 A | 10/1995 | Lomas et al. | |
| 5,552,119 A | 9/1996 | Holmes | |

(Continued)

FOREIGN PATENT DOCUMENTS

| | | |
|---|---|---|
| CN | 102329634 A | 1/2012 |
| EP | 1456325 B1 | 3/2006 |

OTHER PUBLICATIONS

Yang, et al., "Effect of Baffles on Solids Fraction in High Density Riser," Petrochemical Technology, v 30, n 1, p. 32-36, 2001, ISSN: 10008144.

(Continued)

*Primary Examiner* — Walter D Griffin
*Assistant Examiner* — Huy-Tram Nguyen

(57) ABSTRACT

Embodiments of apparatuses and risers for reacting a feedstock in the presence of a catalyst and methods for fabricating such risers are provided. In one example, a riser comprises a sidewall that defines a cylindrical housing surrounding an interior. The sidewall has a groove formed therein disposed about the interior. A plurality of baffle sections is disposed in the groove. The baffle sections are configured to be packed together in the groove to define a packed condition and to be moved in the groove so as to spread out the baffle sections from the packed condition to define an expanded condition and form a baffle ring. The baffle ring extends inwardly in the interior.

20 Claims, 3 Drawing Sheets

(56) References Cited

U.S. PATENT DOCUMENTS

| | | | |
|---|---|---|---|
| 6,511,635 B2 * | 1/2003 | Mauleon et al. | 422/145 |
| 6,596,242 B1 | 7/2003 | Dries | |
| 6,613,290 B1 | 9/2003 | Senior | |
| 7,332,131 B2 | 2/2008 | Chen et al. | |
| 7,658,889 B2 | 2/2010 | Roux et al. | |
| 7,935,314 B2 | 5/2011 | Couch et al. | |
| 7,964,157 B2 | 6/2011 | Dries et al. | |
| 7,972,565 B2 | 7/2011 | Lambin et al. | |
| 2011/0315603 A1 | 12/2011 | Skoulidas et al. | |
| 2013/0280138 A1 * | 10/2013 | Johnson et al. | 422/144 |

OTHER PUBLICATIONS

Bollas, et al., "Modeling Small-Diameter FCC Riser Reactors. A Hydrodynamic and Kinetic Approach," Industrial and Engineering Chemistry Research, v 41, n 22, p. 5410-5419, Oct. 30, 2002, ISSN: 08885885.

Jiang, et al., "Baffle Effects on Performance of a Catalytic Circulating Fluidized Bed Reactor," AIChE Journal, ISSN: 00011541, V 37 n 9, p. 1392-1400, Sep. 1991.

* cited by examiner

APPARATUSES AND RISERS FOR REACTING FEEDSTOCK IN THE PRESENCE OF CATALYST AND METHODS FOR FABRICATING RISERS

TECHNICAL FIELD

The technical field relates generally to apparatuses and risers for reacting a feedstock in the presence of catalyst and methods for fabricating such risers, and more particularly relates to apparatuses and risers including a segmented baffle for improving catalyst contact with a feedstock for reacting, e.g., cracking, the feedstock and methods for fabricating such risers.

BACKGROUND

Fluid catalytic cracking (FCC) is a well known process for the conversion of relatively high boiling point hydrocarbons to lighter hydrocarbons. In many catalytic cracking reactors, often referred to as riser reactors or risers, e.g., vertical pipe reactors, a relatively long chain hydrocarbon feedstock, e.g., gas oil or atmospheric residue, reacts in contact with a catalyst to produce shorter chain products and spent catalyst (e.g., catalyst particles covered with coke). This can be referred to as cracking the feed. The feedstock and fluidized catalyst are introduced at a lower entrance to the vertical riser, and travel vertically upwards within the riser reacting at very high temperatures until reaching an upper exit. The riser is often internally lined to minimize heat loss and resist erosion and/or corrosion.

Reaction efficiency in the riser depends, among other factors, on good and uniform mixing between the feedstock and fluidized catalyst. It is desirable that the feedstock be uniformly dispersed in a stream of fluidized catalyst that is moving up the riser. In many risers, however, even if near uniform dispersion is achieved at the riser entrance, non-uniform mixing can occur as the materials travel upwards due, at least in part, to non-uniform cross sectional gas and catalyst velocities that result primarily from the hydrodynamic condition known as core-annular flow typical of riser flow. In this condition, the upward velocity of the feedstock is lower near the riser wall and higher near the center. In this hydrodynamic regime, more dense fluidized catalyst tends to concentrate near the wall in the slower moving feedstock and on average travels at significantly lower velocity than the gas. The ratio between the average velocities of gas and catalyst may be referred to as reactor slip ratio and can be quite high. For example, high slip ratios of greater than about 1.7 can lead to lower reaction efficiency and yield.

Some attempts have been made to improve mixing along the vertical flow path of the riser. For example, obstacles such as baffles or other contact devices have been proposed to create turbulence and cause more uniform mixing in the riser. Unfortunately, implementing baffles in risers, which are typically relatively tall, e.g., heights of 10 to 50 meters (m), and narrow, e.g., internal diameters of 1 to 3 m, is difficult in general and is particularly problematic in retrofit situations in which the riser must be cut for access and erosion must be controlled downstream of the baffles.

Accordingly, it is desirable to provide apparatuses and risers for reacting a feedstock in the presence of catalyst and methods for fabricating such risers with improved implementation of baffles in the risers to increase reaction efficiency and yield. Furthermore, other desirable features and characteristics of the present invention will become apparent from the subsequent detailed description and the appended claims, taken in conjunction with the accompanying drawings and this background.

BRIEF SUMMARY

Apparatuses and risers for reacting a feedstock in the presence of catalyst and methods for fabricating such risers are provided herein. In accordance with an exemplary embodiment, a riser comprises a sidewall that defines a cylindrical housing surrounding an interior. The sidewall has a groove formed therein disposed about the interior. A plurality of baffle sections is disposed in the groove. The baffle sections are configured to be packed together in the groove to define a packed condition and to be moved in the groove so as to spread out the baffle sections from the packed condition to define an expanded condition and form a baffle ring. The baffle ring extends inwardly in the interior.

In accordance with another exemplary embodiment, an apparatus for fluid catalytic cracking of a feedstock is provided. The apparatus comprises a riser that is configured for contacting the feedstock with catalyst to form a cracked product stream and spent catalyst. The riser comprises a sidewall that defines a cylindrical housing surrounding an interior. The sidewall has a groove formed therein disposed about the interior. A plurality of baffle sections is disposed in the groove. The baffle sections are configured to be packed together in the groove to define a packed condition and to be moved in the groove so as to spread out the baffle sections from the packed condition to define an expanded condition and form a baffle ring. The baffle ring extends inwardly in the interior. A reactor vessel is in fluid communication with the riser and is configured to separate the spent catalyst from the cracked product stream. A stripper is in fluid communication with the reactor vessel and is configured to remove adsorbed and/or entrained hydrocarbons from the spent catalyst. A regenerator is in fluid communication with the stripper and is configured to regenerate the spent catalyst to form regenerated catalyst for use in the apparatus.

In accordance with another exemplary embodiment, a method for fabricating a riser for reacting a feedstock in the presence of catalyst is provided. The method comprises the steps of forming a groove in a sidewall of a cylindrical housing that surrounds an interior such that the groove is disposed about the interior. A plurality of baffle sections is arranged in the groove and the baffle sections are packed together. The plurality of baffle sections is moved in the groove to spread out the baffle sections to form a baffle ring that extends inwardly in the interior.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and risers for reacting a feedstock in the presence of a catalyst and methods for fabricating such risers. The exemplary embodiments taught herein provide a riser comprising a sidewall that defines a cylindrical housing surrounding an interior. A groove is formed in the sidewall about the interior of the riser. In an exemplary embodiment, the sidewall comprises a cylindrical shell and a refractory lining that is disposed on an inner surface of the cylindrical shell. The groove is formed in the refractory lining encircling the interior of the riser.

A plurality of baffle sections are inserted and/or otherwise arranged in the groove in a packed or compacted condition. In particular and in an exemplary embodiment, the baffle sections are each configured with a telescoping portion that fits (e.g., interlocks) into an open end of an adjacent baffle section to allow the baffle sections to be fitted and packed together very closely. As such, the baffle sections can be individually inserted into the groove and moved together so that the telescoping portions fit into the open ends of adjacent baffle sections to tightly pack the baffle sections together so that there is remaining space in the groove to facilitate inserting additional baffle sections into the groove.

In an exemplary embodiment, once all the baffle sections have been inserted and/or otherwise arranged in the groove, some unoccupied space remains in the groove and the baffle sections are then moved in the groove to spread out the baffle sections more evenly to help fill in the unoccupied remaining space to define an expanded condition in which the baffle sections form a baffle ring (e.g., continuous baffle ring formed of interlocking baffle sections). The baffle ring extends from the groove inwardly into the interior of the riser. As such, the baffle ring can effectively act as a contact flow disruptor device for the upwardly flowing feedstock and catalyst in the riser, thereby creating turbulence in the riser to cause more uniform mixing of the feedstock and catalyst to increase reaction efficiency and yield. Moreover, because the baffle sections can be inserted and/or otherwise arranged in the groove in the packed condition and subsequently spread out to form the baffle ring that in various embodiments is continuous and interlocking, implementing the baffle ring into the riser is practical regardless of whether the riser is a new construction or is being retrofitted with the baffle ring.

Figure 1:
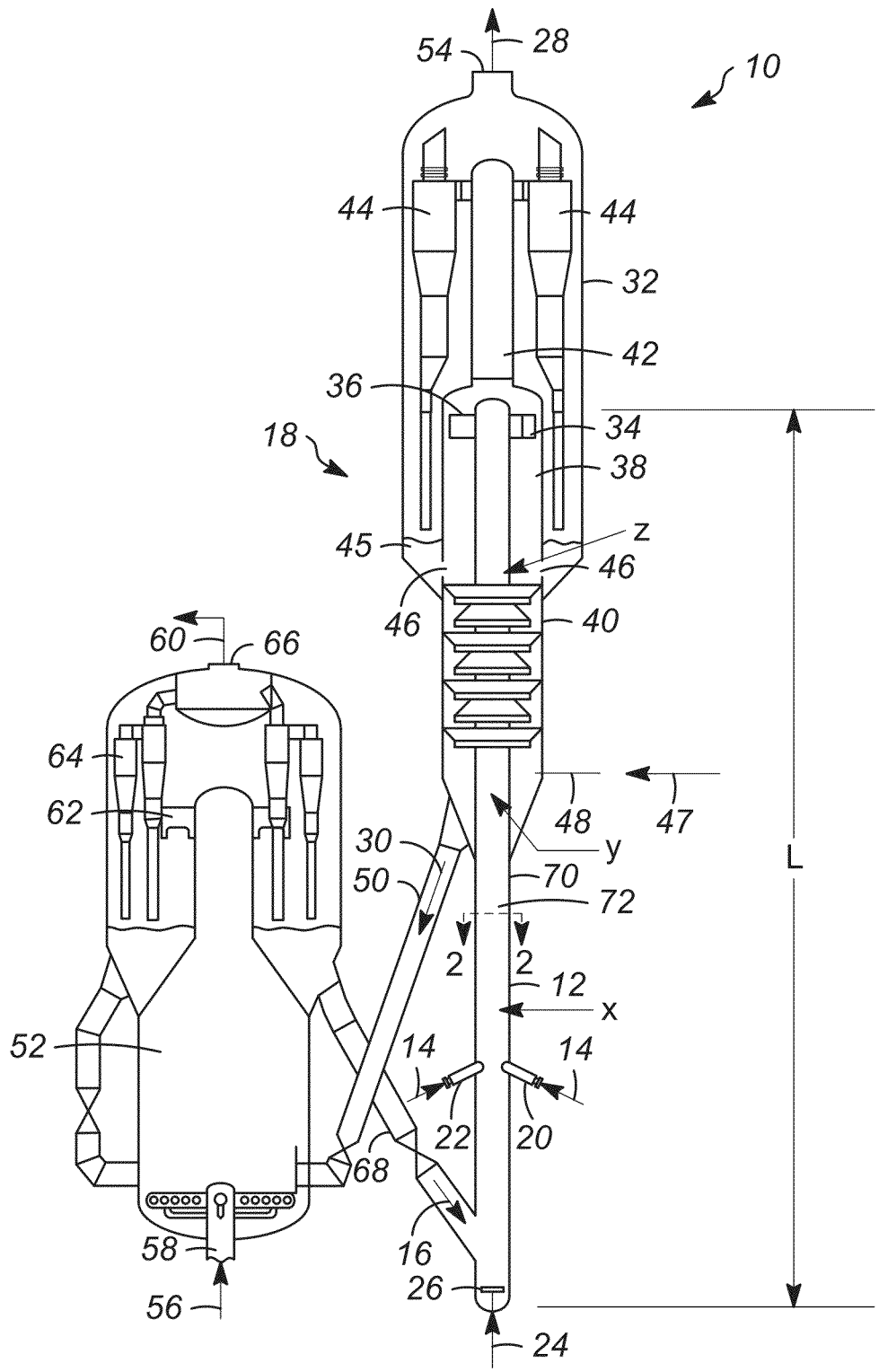
FIG. 1 schematically illustrates an apparatus including a riser for reacting a feedstock in the presence of a catalyst in accordance with an exemplary embodiment.

FIG. 1 schematically illustrates an apparatus 10 including a riser 12 for reacting a feedstock (indicated by single headed arrows 14) and a catalyst (indicated by single headed arrows 16) in accordance with an exemplary embodiment. As illustrated, the apparatus 10 is configured as a fluid catalytic cracking (FCC) apparatus 18 that may be used for an FCC process. The feedstock 14 is injected via distributors 20 and 22 into the riser 12 where it contacts a lift gas (indicated by single headed arrow 24) and the catalyst 16. The lift gas 24 may include inert gas such as steam that is distributed by a lift gas distributor 26. As will be discussed in further detail below, the feedstock 14 is cracked in the riser 12 in the presence of the catalyst 16 to form a cracked product stream (indicated by single headed arrow 28) and spent catalyst (indicated by single headed arrow 30). The distributors 20 and 22 may be located at different radial positions to improve the feedstock 14 distribution in the riser 12 and mixing with the catalyst 16.

In an exemplary embodiment, the injected feedstock 14 mixes with a fluidized bed of the catalyst 16 and moves up the riser 12 reacting, e.g., cracking, and enters the reactor vessel 32. In the reactor vessel 32, the blended catalyst and reacted feed vapors are then discharged from the top of the riser 12 through the riser outlet 34 and separated into the cracked product stream 28 (e.g., cracked product vapor stream) and a collection of catalyst particles covered with substantial quantities of coke and generally referred to as the spent catalyst 30. A swirl arm arrangement 36, provided at the end of the riser 12, may further enhance initial catalyst and cracked hydrocarbon separation by imparting a tangential velocity to the exiting spent catalyst 30 and the cracked product stream 28. The swirl arm arrangement 36 is located in an upper portion of a separation chamber 38, and a stripper 40 is situated in the lower portion of the separation chamber 38. The spent catalyst 30 that is separated by the swirl arm arrangement 36 drops down into the stripper 40.

In an exemplary embodiment, the cracked product stream 28 comprising cracked hydrocarbons including naphtha and some spent catalyst 30 may exit the separation chamber 38 via a gas conduit 42 in fluid communication with cyclones 44. The cyclones 44 may remove the remaining spent catalyst 30 from the cracked product stream 28 to reduce particle concentrations to very low levels. The spent catalyst 30 that is separated by the cyclones 44 returns to the reactor vessel 32 through diplegs into a dense bed 45 where the spent catalyst 30 will pass through chamber openings 46 and enter the stripper 40. The stripper 40 removes adsorbed and/or entrained hydrocarbons from the spent catalyst 30 by countercurrent contact with steam (indicated by single headed arrow 47). Steam 47 may enter the stripper 40 through a line 48. A coked catalyst conduit 50 transfers spent catalyst 30 to a regenerator 52. As illustrated, the cracked product stream 28 exits the top of the reactor vessel 32 through a product outlet 54 for further downstream processing.

The regenerator 52 receives the spent catalyst 30 and typically combusts the coke from the surface of the spent catalyst particles by contact with an oxygen-containing gas (indicated by single headed arrow 56). The oxygen-containing gas 56 enters the bottom of the regenerator 52 via a regenerator distributor 58. Flue gas (indicated by single headed arrow 60) passes upwardly through the regenerator 52. A primary separator, such as a tee disengager 62, initially separates catalyst 16 that has been regenerated from the flue gas 60. Regenerator cyclones 64, or other means, remove entrained catalyst particles from the rising flue gas 60 before the flue gas 60 exits the regenerator 52 through an outlet 66. Combustion of coke from the catalyst particles raises the temperatures of the catalyst 16. The catalyst 16 may pass, regulated by a control valve, through a regenerator standpipe 68 that fluidly communicates with the bottom portion of riser 12.

In the FCC process, the lift gas 24 such as steam may be passed into the riser 12 to contact and lift the catalyst 16 in the in the riser 12 to the feed point (e.g., proximate the distributors 20 and 22). In an exemplary embodiment, the catalyst 16 that has been regenerated and passed along through the regenerator standpipe 68 will have a temperature of from about 649° C. to about 760° C.

Figure 2:
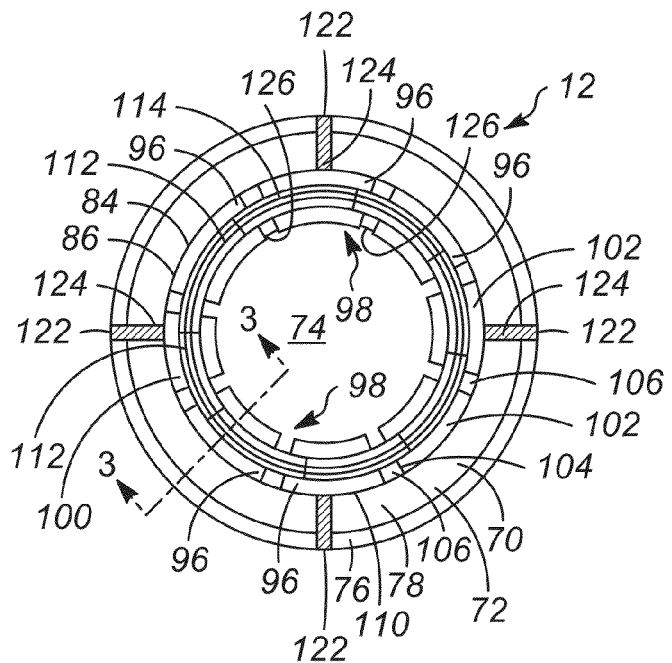
FIG. 2 illustrates, in cross-sectional view, the riser depicted in FIG. 1 along line 2-2 including baffle sections in an expanded condition in accordance with an exemplary embodiment.
Figure 3:
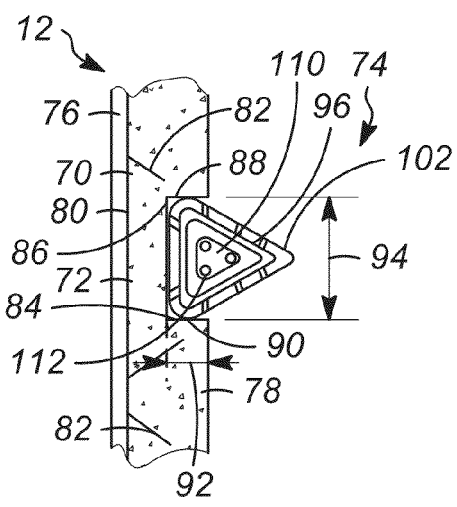
FIG. 3 illustrates, in cross-sectional view, the riser depicted in FIG. 2 along line 3-3.

FIG. 2 illustrates, in cross-sectional view, the riser 12 depicted in FIG. 1 along line 2-2 and FIG. 3 illustrates, in cross-sectional view, the riser 12 depicted in FIG. 2 along line 3-3. Referring to FIGS. 1-3, the riser 12 has a sidewall 70 that defines a cylindrical housing 72 that surrounds an interior 74. In an exemplary embodiment, the cylindrical housing 72 includes a length dimension L that is of from about 10 to about 50 m. It should be appreciated however that the length dimension L may be adjusted as desired.

Referring to FIGS. 2-3, in an exemplary embodiment, the cylindrical housing 72 comprises a cylindrical shell 76 that surrounds the interior 74 and a refractory lining 78 that is disposed along an inner surface 80 of the cylindrical shell 76 facing the interior 74. In an exemplary embodiment, the cylindrical shell 76 has a thickness of from about 10 to about 25 mm, and the refractory lining 78 has a thickness of from about 10 to about 200 mm. As illustrated, a plurality of anchors 82 extend from the cylindrical shell 76 into the refractory lining 78 and anchor or otherwise fix the refractory lining 78 to the cylindrical shell 76. In an exemplary embodiment, the anchors 82 are configured as a mesh (e.g., hex mesh) that is coupled to the cylindrical shell 76 and refractory material is directly cast into the mesh onto the inner surface 80 of the cylindrical shell 76. In an exemplary embodiment, the refractory material is an alumina-based concrete that when set or cured, forms a thermal-, abrasion-resistant lining. Alternative materials known to those skilled in the art may also be used to form the refractory lining 78. The cylindrical shell 76 may be made of metal or any other structural material typically used for forming a tubular reactor vessel.

A groove 84 is formed in the sidewall 70 about the interior 74. In an exemplary embodiment, the groove 84 is formed by casting, machining, or cutting the groove 84 into the refractory lining 78. As illustrated, the groove 84 has a recessed base surface 86 that extends between sidewalls 88 and 90. In an exemplary embodiment, the groove 84 has a depth (indicated by double headed arrow 92) of from about 10 to about 125 mm and a width (indicated by double headed arrow 94 of from about 100 to about 500 mm.

A plurality of baffle sections 96 is disposed in the groove 84. As will be discussed in further detail below and as illustrated in FIG. 2, the baffle sections 96 are circumferentially aligned and spread out substantially evenly along the groove 84 to define an expanded condition 98, forming a baffle ring 100, which in various embodiments is continuous, and surrounds and extends inwardly into the interior 74 of the riser 12. In an exemplary embodiment, one or more baffle rings 100 may be disposed in the riser 12 at various elevations, such as, for example, correspondingly at elevations X, Y, Z, or therebetween (see FIG. 1). As such, the baffle ring(s) 100 can effectively act as a contact flow disruptor device for the upwardly flowing feedstock 14 and catalyst 16 in the riser 12, thereby creating turbulence in the riser 12 to cause both more intimate mixing and more uniform velocity distributions of the feedstock 14 and catalyst 16 to increase reaction efficiency, more plug flow, resulting in higher feedstock conversion and more selective yields with less coke and gas.

Figure 4:
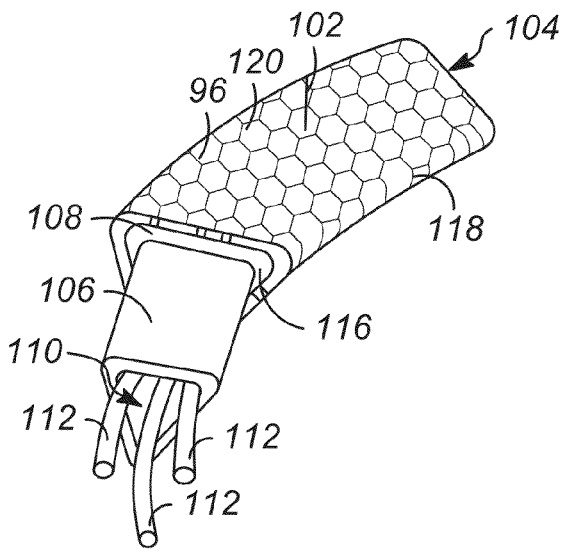
FIG. 4 illustrates, in perspective view, a baffle section in accordance with an exemplary embodiment.

Referring to FIGS. 2-4, in an exemplary embodiment, the baffle sections 96 each have an arc body portion 102, an open end portion 104, and a telescoping portion 106. The telescoping portion 106 projects or extends outwardly from an end 108 of the arc body portion 102 opposite the open end portion 104 and is configured to be received into a corresponding open end portion 104 of an adjacent baffle section 96. In an exemplary embodiment, the telescoping portion 106 interlocks with the corresponding open end portion 104 of an adjacent baffle section 96. As illustrated, a channel 110 is correspondingly formed through each of the open end portions 104, the arc body portions 102, and the telescoping portions of the baffle sections 96. In an exemplary embodiment, the telescoping portions 106 are correspondingly configured having a cross-section, for example, with a generally triangular perimeter (or other polygon shape for example) that fits into the channel 110 formed in the open end portions 104 (e.g., channels 110 may have variable cross-sections such that they are wider at the open end portions 104) to allow the telescoping portions 106 to be advanced or slid in and out of the open end portions 104. As such and as will be discussed in further detail below, corresponding telescoping portions 106 can be moved in and out of corresponding adjacent open end portions to allow the arc body portions 102 to be moved relative to each other to either tightly pack the arch body portions 102 closely together (see FIG. 5) or to spread out or space apart the arc body portions 102 as illustrated in FIG. 2 to define the expanded condition 98.

Alternatively or in addition to the telescoping portions 106, one or more rods 112 may be used to correspondingly define one or more hoops 114 (e.g., continuous or closed hoops) that extend through the channels 110 of the baffle sections 96. The hoops 114 provide structure for the baffle sections to circumferentially move or slide relative to each other along the hoops 114 to either tightly pack the arc body portions 102 closely together (see FIG. 5) or to spread out or space apart the arc body portions 102 as illustrated in FIG. 2 to define the expanded condition 98.

In an exemplary embodiment, the arc body portions 102 each have a core portion 116 and an abrasion resistant lining 118 that overlies the core portion 116. The core portion 116 may be formed of metal, ceramic, or the like. The abrasion resistant lining 118 may be formed using a hex mesh 120 that is coupled to the core portion 116 and a refractory material, such as an aluminum-based concrete, may be directly cast into the hex mesh 120 and set or cured to form a refractory lining that is both thermally resistant and abrasion resistant. Alternative materials known to those skilled in the art may also be used to form the abrasion resistant lining 118.

As illustrated, attachment features 122 are used to couple at least some of the baffle sections 96 to the sidewall 70 to fix the positions of the baffle sections 96 in the expanded condition 98. In an exemplary embodiment, the attachment features 122 are configured as pins 124 that extend through the sidewall 70 and are attached to the corresponding baffle sections 96. Alternatively or in addition to coupling at least some of the baffle sections 96 to the sidewall 70, some or all of the baffle sections 96 may be joined in the expanded condition 98, for example, by welding the corresponding telescoping portions 106 to the open end portions 104 of the adjacent baffle sections 96.

In an exemplary embodiment, one or more of the baffle sections 96 are not coupled to the sidewall 70 or otherwise fixed in position but rather, are allowed to move freely in the groove 84 between the baffle sections 96 that are fixed in position. As such, during start up and/or shut down of the operation of the FCC apparatus 18, the temperatures in the riser 12 may substantially change, and by having some of the baffle sections 96 free to move along the groove 84, the baffle ring 100 is allowed to expand or contract during substantial temperature changes without inducing significant thermal stresses in areas proximate to the attachment features 122, welding joints, or other like joining areas.

Optionally, shrouds 126 (shown in two places) may be positioned between the arc body portions 102 to provide the baffle ring 100 a circumferentially continuous surface that extends into the interior 74 of the riser 12. The shrouds 126 may couple directly to the telescoping portions 106 or alternatively, coupled to the rods 112 that form the hoops 114.

Figure 5:
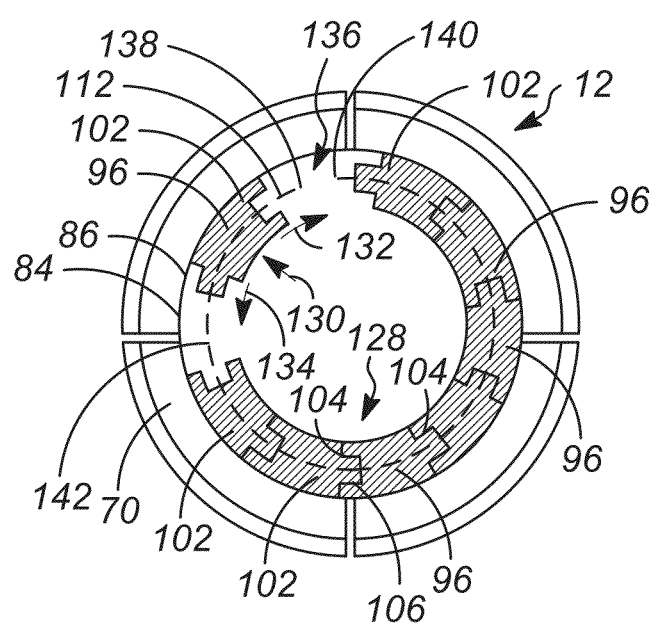
FIG. 5 illustrates, in cross-sectional view, a riser including baffle sections in a packed condition in accordance with an exemplary embodiment.

FIG. 5 illustrates, in cross-sectional view, the riser 12 including the baffle sections 96 during an earlier fabrication stage in accordance with an exemplary embodiment. The baffle ring 100 illustrated in FIG. 2 may be fabricated by arranging the baffle sections 96 in the groove 84 closely or tightly packed together to define a pack condition 128. As illustrated, a particular baffle section 96 may be inserted (indicated by single headed arrow 130) into the groove 84 and moved circumferentially (indicated by either single headed arrows 132 or 134) in the groove 84 to closely or tightly pack the corresponding arc body portion 102 with the arc body portion 102 of an adjacent baffle section 96. As illustrated, in the pack condition 128, the telescoping portions 106 are fully inserted into the open end portions 104 of the adjacent baffle sections 96. Once all the baffle sections 96 have been inserted and/or otherwise arranged in the groove 84 some unoccupied space 136 remains in the groove 84. The baffle sections 96 are then circumferentially moved in the groove 84 to spread out the baffle sections 96 more evenly (e.g., moving the telescoping portions 106 at least partially out of the open end portions 104 of the adjacent baffle sections 96) to help fill in the unoccupied space 136 to define the expanded condition 98 shown in FIG. 2.

In the embodiments in which one or more rods 112 (shown in dashed line) are used, each rod 112 has two opposing ends 138 and 140 that are not connected to define an open hoop 142. The baffle sections 96 are circumferentially moved over one of the ends 138 and 140 and along the rod(s) 112 to position the arc body portions 102 immediately adjacent to each other to define the pack condition 128. Once all of the baffle sections have been arranged in the groove 84, the baffle sections 96 are spaced out to define the expanded condition 98 shown in FIG. 2. Then the opposing ends 138 and 140 of the rods 112 are joined together, e.g., welded together, to define the hoops 114 shown in FIG. 2. In the expanded condition 98, one or more of the baffle sections 96 are then fixed in position as discussed above.

Accordingly, apparatuses and risers for reacting a feedstock in the presence of a catalyst and methods for fabricating such risers have been described. The exemplary embodiments taught herein provide a riser comprising a sidewall that defines a cylindrical housing surrounding an interior. A groove is formed in the sidewall about the interior of the riser. A plurality of baffle sections are inserted and/or otherwise arranged in the groove in a packed or compacted condition. Once all the baffle sections have been inserted and/or otherwise arranged in the groove some unoccupied space remains in the groove and the baffle sections are then moved in the groove to spread out the baffle sections more evenly to help fill in the unoccupied remaining space to define an expanded condition in which the baffle sections form a baffle ring. The baffle ring extends from the groove inwardly into the interior of the riser.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A riser for reacting a feedstock in the presence of catalyst, the riser comprising:
    a sidewall defining a cylindrical housing that surrounds an interior, wherein the sidewall has a groove formed therein disposed about the interior; and
    a plurality of baffle sections disposed in the groove and configured to be packed together in the groove to define a packed condition and to be moved in the groove so as to spread out the baffle sections from the packed condition to define an expanded condition and form a baffle ring that extends inwardly in the interior.

2. The riser of claim 1, wherein each of the baffle sections has an arc body portion that has a first open end and a telescoping portion that extends outwardly from a second end of the arc body portion disposed opposite the first open end, and wherein the telescoping portions are configured to be correspondingly received into the first open ends of adjacent baffle sections.

3. The riser of claim 2, wherein each of the first open ends define a channel and each of the telescoping portions define a protrusion having a cross-section with a generally triangular perimeter, and wherein the channel is configured to receive the protrusion.

4. The riser of claim 2, wherein each of the baffle sections define a channel form through the first open end, the arc body portion, and the telescoping portion, and wherein the riser comprises:
    a rod defining a hoop extending through the channels of the baffle sections.

5. The riser of claim 4, wherein the rod has two opposing ends that are joined together to define the hoop when the baffle sections are in the expanded condition.

6. The riser of claim 4, further comprising:
    at least one additional rod that correspondingly defines at least one additional hoop that extends through the channels of the baffle sections.

7. The riser of claim 2, wherein each of the arc body portions has a core portion and an abrasion resistant lining overlying the core portion.

8. The riser of claim 2, wherein at least one of the telescoping portions is joined correspondingly to at least one of the open ends of at least one of the adjacent baffle sections when the baffle sections are in the expanded condition.

9. The riser of claim 8, wherein at least one of the baffle sections is allowed to move in the groove independently of the other baffle sections when the baffle sections are in the expanded condition.

10. The riser of claim 1, further comprising:
    a plurality of shrouds correspondingly disposed between the baffle sections when the baffle sections are in the expanded condition.

11. The riser of claim 1, further comprising:
    at least one attachment feature that correspondingly couples at least one of the baffle sections to the sidewall.

12. The riser of claim 10, wherein each of the at least one attachment feature is configured as a pin that is disposed through the sidewall and is correspondingly attached to one of the baffle sections.

13. The riser of claim 1, wherein each of the baffle sections defines a channel form therethrough and the riser further comprises:
    a rod defining a hoop that extends through the channels of the baffle sections.

14. An apparatus for fluid catalytic cracking of a feedstock, the apparatus comprising:

a riser configured for contacting the feedstock with catalyst to form a cracked product stream and spent catalyst, the riser comprising:
   a sidewall defining a cylindrical housing that surrounds an interior, wherein the sidewall has a groove formed therein disposed about the interior; and
   a plurality of baffle sections disposed in the groove and configured to be packed together in the groove to define a packed condition and to be moved in the groove so as to spread out the baffle sections from the packed condition to define an expanded condition and form a baffle ring that extends inwardly in the interior;
a reactor vessel in fluid communication with the riser and configured to separate the spent catalyst from the cracked product stream;
a stripper in fluid communication with the reactor vessel and configured to remove adsorbed and/or entrained hydrocarbons from the spent catalyst; and
a regenerator in fluid communication with the stripper and configured to regenerate the spent catalyst to form regenerated catalyst for use in the apparatus.

15. A method for fabricating a riser for reacting a feedstock in the presence of catalyst, the method comprising the steps of:
   forming a groove in a sidewall of a cylindrical housing that surrounds an interior such that the groove is disposed about the interior;
   arranging a plurality of baffle sections in the groove and packed together; and
   moving the plurality of baffle sections in the groove to spread out the baffle sections to form a baffle ring that extends inwardly in the interior.

16. The method of claim 15, wherein each of the baffle sections has an arc body portion that has a first open end and a telescoping portion that extends outwardly from a second end of the arc body portion disposed opposite the first open end, and wherein the step of arranging comprises:
   correspondingly advancing the telescoping portions into the first open ends of adjacent baffle sections.

17. The method of claim 16, wherein the step of moving comprises:
   correspondingly moving the telescoping portions at least partially out of the first open ends of the adjacent baffle sections to spread out the baffle sections.

18. The method of claim 15, wherein each of the baffle sections defines a channel form therethrough, and wherein the step of arranging comprises:
   advancing a first end of a rod through the channels of the baffle sections to position the baffle sections immediately adjacent to each other.

19. The method of claim 18, further comprising the step of:
   joining the first end of the rod to a second end of the rod disposed opposite the first end to define a hoop, and wherein the step of moving comprises moving the baffle sections along the hoop to spread out the baffle sections.

20. The method of claim 15, further comprising the step of:
   coupling at least one of the baffle sections to at least one other baffle section or to the sidewall after the step of moving.

* * * * *